Sept. 13, 1966  C. A. BROWNELL, JR  3,272,435
SMOG ACCUMULATION PREVENTING APPARATUS
Filed Oct. 10, 1963  3 Sheets-Sheet 1
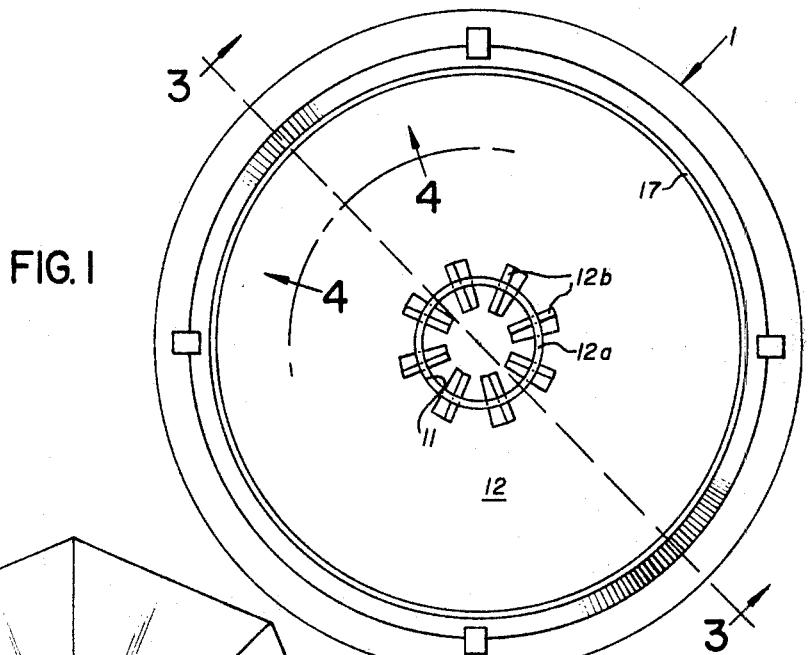
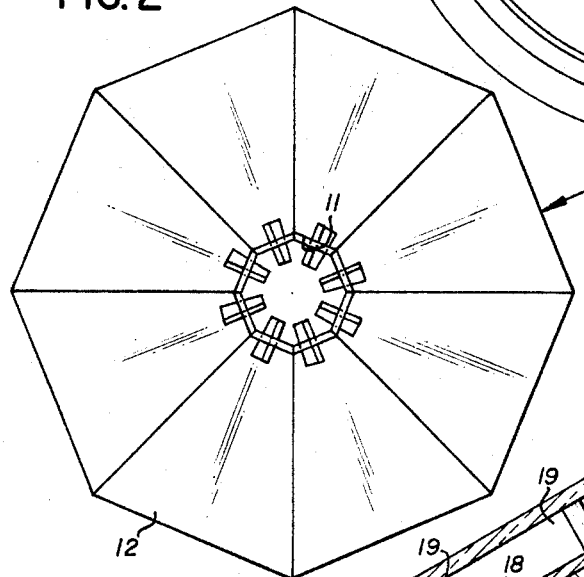
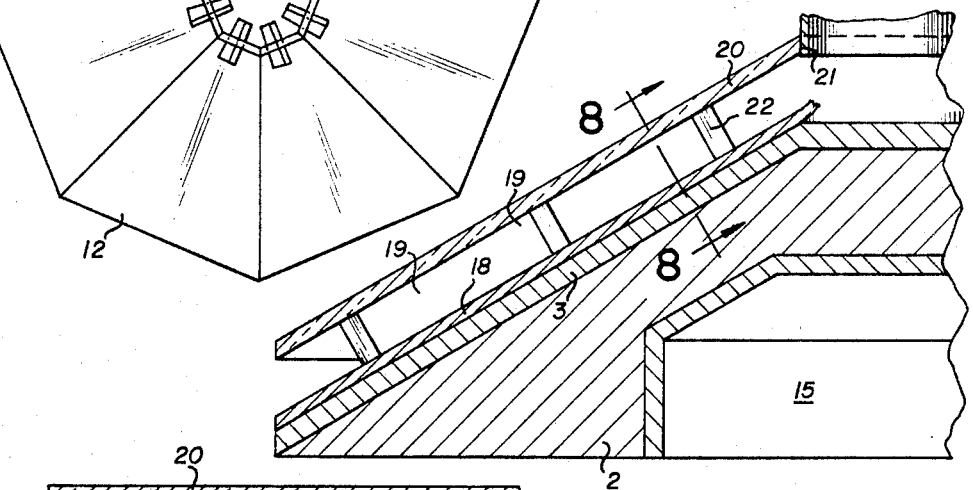
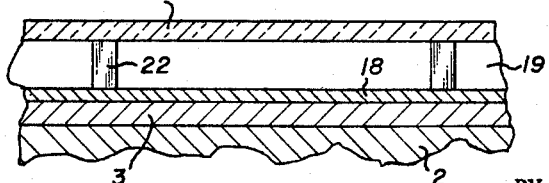
INVENTOR
Carl A. Brownell Jr.
BY *Larman, Larman & McCulloch*
ATTORNEY Sept. 13, 1966    C. A. BROWNELL, JR    3,272,435
SMOG ACCUMULATION PREVENTING APPARATUS
Filed Oct. 10, 1963    3 Sheets-Sheet 2
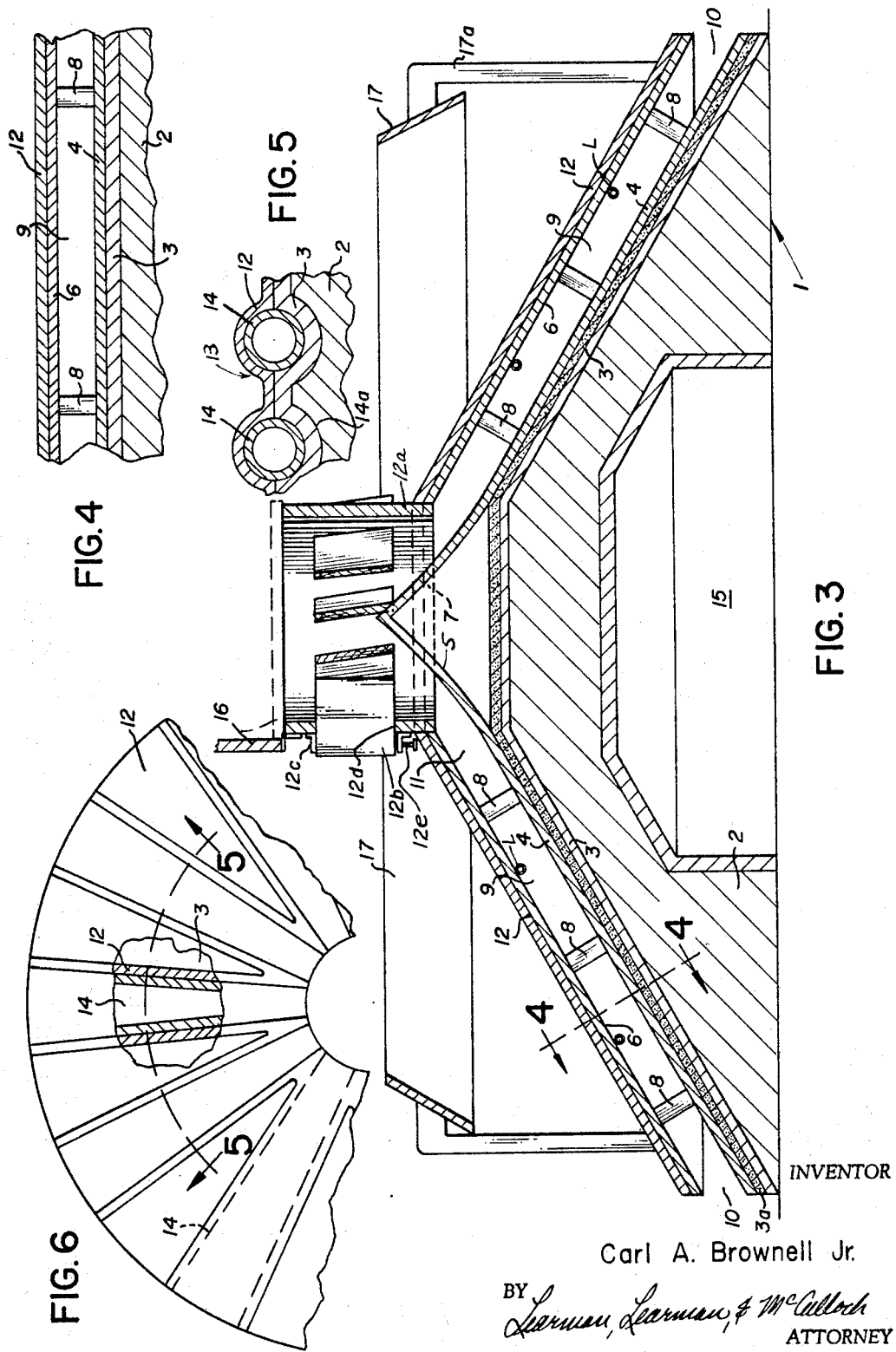
INVENTOR
Carl A. Brownell Jr.
BY *Learman, Learman, & McCulloch*
ATTORNEY

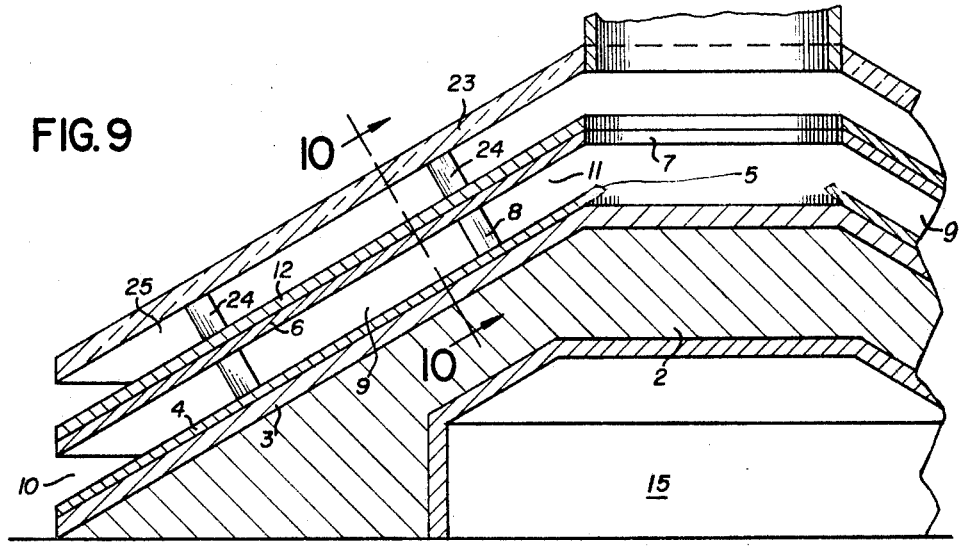
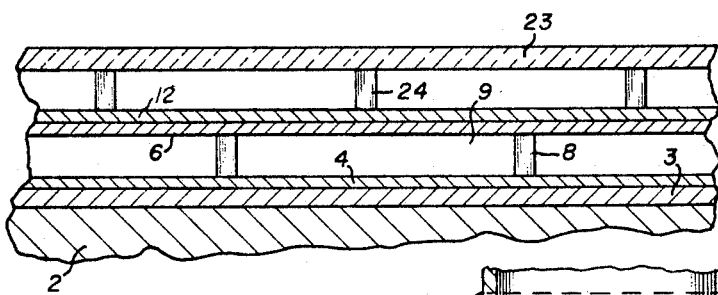
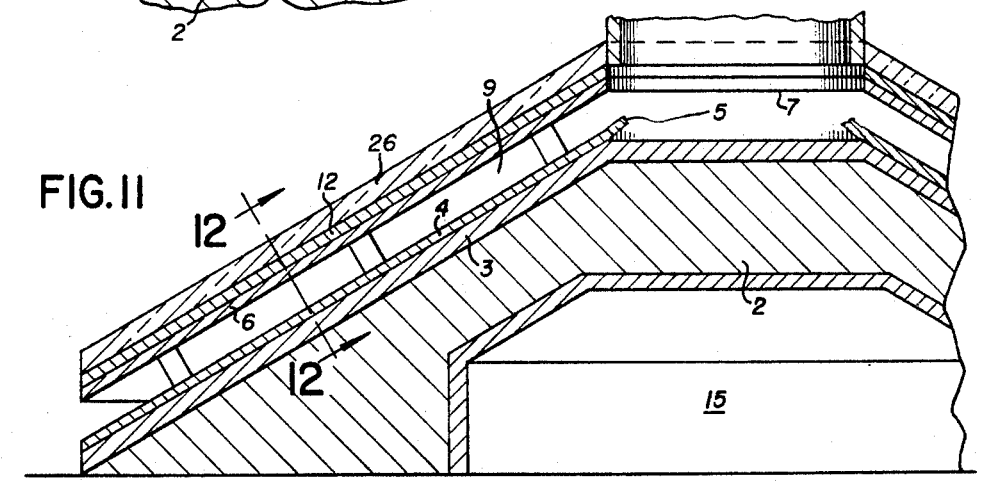
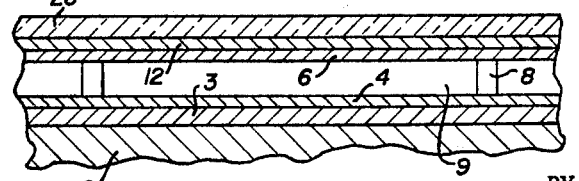

United States Patent Office 3,272,435
Patented Sept. 13, 1966

3,272,435
SMOG ACCUMULATION PREVENTING
APPARATUS
Carl A. Brownell, Jr., 3123 S. U.S. 23, Greenbush, Mich.
Filed Oct. 10, 1963, Ser. No. 315,331
16 Claims. (Cl. 239—14)

This invention relates primarily to means for preventing the accumulation of smog, and which is especially adapted for use in the various areas throughout the country where a thermal inversion often exists which frequently prevents the dissipation of smog.

It is well known that the accumulation of smog may be prevented by providing an updraft of heated air having a temperature higher than atmospheric temperature so that it will ascend up through the region of thermal inversion and thereby prevent the accumulation of smog.

In accordance with the present invention I contemplate the utilization of sun rays as a source of heat and providing means by which the ambient air may be heated thereby and caused to ascend upwardly in a column. To this end I provide a preferably, but not necessarily, frusto-conical mound of earth, the base of which may be on the order of several thousand feet in diameter, the top of which may be on the order of several hundred feet in diameter, and the height of which may likewise be on the order of several hundred feet.

In one form of the invention I cover the mound of earth with a layer of suitable heat insulating material such as sheets of polystyrene foam. The layer of insulating material is then covered throughout the entire surface thereof with upwardly inclined air duct means which extend from the bottom to the top of the frusto-conical mound and are open at the lower and upper ends thereof. The duct means is then covered with a layer of heat absorbent black material such as asphalt, blacktop paving material, or the like, which are non-reflective. The air duct means may be completely annular, or it may consist of a plurality of radially extending conduits such, for instance, as concrete sewer pipes. If a completely annular air duct is provided it may consist of a pair of vertically spaced, frusto-conical metal sheets, the lower one of which is placed upon and is supported by the layer of insulation, and the upper one of which is spaced from and supported by a plurality of spacers which are interposed between the upper and lower sheets. Or, if desired, the lower sheet may be dispensed with, in which case the upper sheet would be spaced from the layer of insulation by interposed spacers. The quantity of air heated and the temperature to which it is heated may be increased by covering the insulation material with a layer of earth to increase the mass which is heated.

During the day the outer covering of heat absorbent material will be heated by the sun rays. The air duct means will then be heated by conduction from the heat absorbent material. The heated ducts will in turn, heat the air therein and thereby create a constant updraft of heated air which enters the duct means through the lower open end thereof and is discharged out through the upper open end thereof. After discharge from the duct means the heated air will constantly ascend until it has cooled down to the temperature of the surrounding air, at which time it will be above the layer of temperature inversion.

The earth mound is preferably formed over and above a housing which may be used for various purposes, such as a parking garage, an air raid shelter or a warehouse, etc. It is also contemplated that reflector means may be provided by which the far side of the device would be heated by reflected rays of the sun, as the sun rises and sets, since during that time the far side of the device would be shaded.

In another form of the invention, I cover the earth mound with a layer of insulation having a layer of black nonreflective heat absorbent material applied to the upper surface thereof. A completely annular duct means is then formed by a conical glass top which is spaced from the layer of heat absorbent material and is supported by suitable spacers. In this form of the invention the air passing upwardly through the duct means is heated by convection and radiation from the heat absorbent material, the radiant heat from the heat absorbent material being contained within the duct means by the glass top. It may be expedient to heat a greater quantity of air to a higher temperature to place several inches of earth on top of the insulating material and to apply the black nonreflective layer on top of the earth.

In still another form of the invention I provide the device with a pair of superimposed duct means. In accordance with this form of the invention I cover the mound of earth with a layer of insulation over which the lower of the pair of duct means is placed and covered with a layer of heat absorbing material. The heating effect again could be increased by applying a layer of earth over the layer of insulation. A conical glass top which is supported by suitable spacers is placed over the layer of heat absorbent material in vertical spaced relation thereto to provide the upper of the pair of duct means. The lower duct means may be completely annular or it may comprise a plurality of radially extending conducts, whereas the upper duct means is completely annular. In this form of the invention the lower duct means is heated by conduction from the heat absorbent material and the air passing upwardly therethrough is heated by convection from the duct means; and the air passing upwardly through the upper duct means is heated by convection and radiation from the layer of heat absorbent material.

In still another form of the invention I cover the mound of earth with a layer of insulation over which the duct means is placed and covered with a layer of heat absorbent material. A layer of earth may be sandwiched between the insulation and heat absorbent material. A glass top is then applied directly to the heat absorbent material. The glass top serves to increase the heating effect of the heat absorbent material upon the duct means and consequently the air passing through the duct means.

The principal object of the invention is to provide means for dispelling smog which utilizes the rays of the sun for producing upwardly ascending currents of air which have been heated sufficiently to pass upwardly through the layer of temperature inversion before cooling down to the temperature of the ambient air.

Another object of the invention is to provide means of the aforesaid character which is completely exothermic in operation, is, when in normal operation, devoid of any moving parts, and does not require any attendance during operation.

Having stated the principal objects of the invention, other and more limited objects thereof will be apparent from the following specification and the acompanying drawings forming a part thereof in which:

FIGURE 1 is a plan view of a device for dispelling smog which utlilizes sun rays for creating ascending currents of heated air and is constructed according to my invention;

FIGURE 2 is a view similar to FIGURE 1 showing the device as having a slightly different exterior shape;

FIGURE 3 is an enlarged central vertical section taken on the line 3—3 of either FIGURE 1 or FIGURE 2;

FIGURE 4 is a fragmentary vertical section taken on the line 4—4 of FIGURES 1 and 3;

FIGURE 5 is a view similar of FIGURE 4 showing a slightly different type of air duct means;

FIGURE 6 is a fragmentary plan view, partially broken away, of the device as shown in FIGURE 5;

FIGURE 7 is a fragmentary central vertical section showing a slightly different form of the invention;

FIGURE 8 is a transverse fragmentary section taken on the line 8—8 of FIGURE 7;

FIGURE 9 is a view similar to FIGURE 7 showing another form of the invention;

FIGURE 10 is a transverse fragmentary section taken on the line 10—10 of FIGURE 9;

FIGURE 11 is a view similar to FIGURES 7 and 9 showing still another form of the invention; and FIGURE 12 is a transverse fragmentary section taken on the line 12—12 of FIGURE 11.

The construction and operation of the device having been generally described, they will now be specifically described in connection with the drawings with the use of reference characters. Referring first to FIGURES 1 to 6 of the drawings, the form of the invention shown therein and generally indicated by the numeral 1 comprises a mound of earth 2 which may be frusto-conical, as shown in FIGURE 1, frusto-pyramidal, as shown in FIGURE 2, or any other suitable shape. The entire upper surface of the mound of earth is covered by a layer of heat insulating material 3 such as polystyrene foam which may be covered by a layer of earth 3a. A frusto-conical sheet 4 of heat conducting and radiating material, such as iron or steel, or a suitable asphalt composition, which is provided with a conical top 5 at the upper end thereof is applied to the conical outer surface of the layer of insulation 3. Another frusto-conical sheet 6, which is similar to the sheet 4 and is provided with an axial opening 7 of generally the same diameter as the top 5 in the sheet 4, is disposed over and above the sheet 4 in vertically spaced aerial alignment therewith. The sheet 6 is spaced from the sheet 4 and supported by suitable spacers 8 which are interposed between. The sheets 4 and 6 define an annular duct means 9 which is open at the lower and upper ends thereof as indicated at 10 and 11, respectively. The outer surface of the upper sheet 6 is covered with a layer 12 of heat absorbent nonreflective material such as asphalt or black-top paving material.

During the day the layer 12 of heat absorbent material will be heated by the sun rays. The heat absorbent material when heated will then heat the duct means 9, by conduction, which in turn will heat the air in the duct means 9 by convection and radiation, thereby causing it to constantly flow upwardly and out through the open upper end 11 of the duct means 9 and to draw air into the duct means through the lower open end 10 thereof. The duct 12a has upwardly inclined, helical baffle plates or vanes 12b which direct the flow upwardly. They also provide the flow with a spiraling motion but are so pitched that this motion is counterclockwise if the device is located in the Northern Hemisphere and clockwise if the device is located south of the equator. The spiral imparted directs the warm air current upwardly while tending to prevent it from dissipating. The plates 12b are radially movable between vertically spaced guides 12c adjacent slots 12d in the duct 12a, set screws 12e being threaded in the lower guides 12c and engageable with the plates 12b to secure them in adjusted positions as shown to permit them to achieve the ideal spiral each day dependent on conditions.

A slightly different form of duct means 13 is shown in FIGURES 5 and 6. As shown therein, the duct means 13 comprises a plurality of radially disposed open ended conduits 14, such as concrete sewer pipes, which are partially embedded in the layer 3 of insulating material as indicated at 14a. A layer of earth (not shown) could be interposed between the insulating material 3 and conduits 14. The upper portions of the conduits 14 and upper surface of the insulating material between adjacent conduits 14 is covered by the heat absorbent material 12.

It is contemplated that the mound 2 of earth may be formed over and about a housing 15 which could be used for various purposes, such as a parking garage, an air raid shelter or a storage warehouse. Also, the size of the housing 15 could be such that the roof supported the smog controlling device.

During the time the device is heating up to the desired temperature to accomplish its purpose, air flow through the device is prevented. For this purpose a hinged cover 16 is provided on the duct 12a or gate means (not shown) could be provided at the lower end of the device or within duct space 9. Water lines L should also be provided to permit cooling the device, when desired, by spraying water into duct space 9.

As the sun rises and sets the far side of the device is more or less shaded, depending on the position of the sun in its orbit. Reflector means 17 supported by framework 17a may therefore be provided by which sun rays are reflected onto the shaded portion of the device.

FIGURES 7 and 8 disclose a modified form of the device. As shown therein, a layer 18 of heat absorbent material is applied to the entire outer surface of the layer 3 of insulating material. An open ended annular duct means 19 is then formed by the layer 18 of heat absorbent material and a frusto-conical glass top 20, having an axial opening 21, which is mounted over the layer 18 of heat absorbent material in vertical spaced relation thereto by spacers 22 which are interposed between the layer 18 of heat absorbent material and the glass top 20 or supported in any other suitable manner. In this form of the device, air passing through the duct means 19 is heated directly from the layer 18 of heat absorbent material by radiation and convection. The glass top 20, in addition to forming the upper wall of the duct means 20, serves to increase the heating effect of the layer 18 of heat absorbent material.

FIGURES 9 and 10 disclose another modified form of the device in which a pair of superimposed annular duct means are provided. This form of the invention is a combination of the two forms of the invention as shown in FIGURES 1 to 4, and FIGURES 7 and 8, respectively, in that a glass top 23, similar to the glass top 20 of FIGURES 7 and 8, is mounted over the heat absorbent layer 12 of FIGURES 3 and 4 in vertically spaced relation thereto by suitable spacers 24. The layer 12 of heat absorbent material and the glass top 23 define an annular duct means 25 which is superimpored upon the duct means 9. In this form of the invention the air passing through both the duct means 9 and the duct means 25 is heated from the single layer 12 of heat absorbent material. The glass top 23 not only constitutes the upper wall of the duct means 25 but also, as in FIGURES 7 and 8, serves to increase the heating effect of the layer 12 of heat absorbent material. Otherwise the construction and operation of this form of the invention is identical with that shown and described in connection with FIGURES 1 to 4 and the same reference numerals have been applied to like parts.

FIGURES 11 and 12 disclose still another form of the invention in which a frusto-conical glass top 26, similar to the glass top 20 and 23 of FIGURES 7 and 9, respectively, is applied to the heat absorbent layer 12 of the form of the invention shown in FIGURES 3 and 4. The glass top 26, as in FIGURES 7 and 9, serves to increase the heating efficiency of the layer 12 of heat absorbent material. Otherwise the construction and operation of this form of the invention is identical with that shown and described in connection with FIGURES 1 to 4.

Although the invention has been shown and described in connection with the prevention of the accumulation of smog, it is equally adaptable for creating thermal up currents of air for sustaining gliders or other sail planes in flight. It may also be utilized for the seeding of clouds to produce rain. When used in this connection the device could be much smaller, on the order of fifty to several hundred feet in base diameter and would be portably built so that it could be installed as desired. Silver iodide or other suitable chemicals would be supplied to the air stream issuing from the top of the device which would carry them up into the atmosphere.

From the foregoing it will be apparent to those skilled in this art that I have provided a relatively simple and very efficient device for accomplishing the objects of the invention.

And it is to be understood that I am not limited to the specific embodiments of the invention as shown and described herein, as various modifications may be made therein within the spirit of the invention and the scope of the appended claims.

I claim:

1. An exothermic smog accumulation preventing device which utilizes sun rays to create ascending thermal currents of heated air, said device comprising a substantially frustoconical mound of earth, a layer of heat insulating material applied to the upper surface of said mound, upwardly inclined air duct means open at the lower and upper ends thereof and overlying said layer of insulating material and communicating with one another at their upper ends, and a layer of relatively nonreflective, heat absorbent material overlying said air duct means operative to absorb heat from the sun and effect the heating of air in said duct means to a temperature higher than the temperature of the ambient air and cause the heated air to pass upwardly through said duct means, said heat absorbent material having an opening therein at the apex of said mound in communication with each of said duct means and upwardly through which said heated air may pass.

2. An exothermic smog accumulation preventing device as defined by claim 1 in which said mound of earth is formed over a housing which is adapted to be used for various purposes.

3. An exothermic smog accumulation preventing device as defined by claim 1 in which means are provided by which the flow of air through said duct means may be selectively controlled.

4. An exothermic smog accumulation preventing device as defined by claim 1 in which reflector means are provided by which sun rays are reflected against the shaded outer surface of said device.

5. An exothermic smog accumulation preventing device as defined by claim 1 in which said air duct means comprises a plurality of radially disposed open ended tubular conduits having the lower portions thereof embedded in said layer of insulating material and the upper portions thereof covered by said layer of heat absorbent material.

6. The combination defined in claim 1 in which a layer of earth is applied over said heat insulating material.

7. The combination defined in claim 1 in which means is provided in the opening of said absorbent material to upwardly spiral the heated air issuing from the upper end of said duct means.

8. The combination defined in claim 7 in which said means to upwardly spiral the heated air comprises circumferentially spaced, upwardly inclined, radially adjustable, helical baffle plates.

9. An exothermic smog accumulation preventing device as defined by claim 1 in which said duct means comprises a pair of similar superimposed frusto-conical plates of heat conducting and radiating material, one of said plates being applied to the outer surface of said layer of insulating material and the other of said plates being mounted in fixed position in vertically spaced relation above said one of said plates thereby defining a completely annular air duct, and in which said layer of heat absorbent material is applied directly to the outer surface of the said other of said plates; said layer of heat absorbent material being operative to absorb heat from the sun and to heat said air conduit means by conduction, and said air conduit means being operative to heat air passing therethrough by convection and radiation.

10. An exothermic smog accumulation preventing device as defined by claim 9 in which reflector means are provided by which sun rays are reflected against shaded portions of said device during rising and setting of the sun.

11. An exothermic smog accumulation preventing device which utilizes sun rays to create ascending thermal currents of heated air, said device comprising a frusto-conical mound of earth, a layer of heat insulating material applied to the upper surface of said mound, a layer of heat absorbent material applied to the upper surface of said layer of insulating material, and a frusto-conical glass top mounted in fixed position above said layer of heat absorbent material in vertically spaced relation thereto, said glass top and said layer of heat absorbent material defining an open ended annular air duct, said glass top having an opening therein at the apex of said mound in communication with said duct, said heat absorbent material being operative to absorb heat from the sun and to heat air passing upwardly through said air duct by convection and radiation, and said glass top being also operative to increase the heating effect of said heat absorbent material.

12. An exothermic smog accumulation preventing device which utilizes sun rays to create ascending thermal currents of heated air, said device comprising a frusto-conical mound of earth, a layer of heat insulating material applied to the upper surface of said mound, a pair of similar superimposed frusto-conical metal plates one of which is applied to the upper surface of said layer of insulating material and the other of which is mounted in fixed position above said one of said plates in vertically spaced relation thereto, a layer of heat absorbent material applied to the upper surface of the said other of said plates, and a frustoconical glass top mounted in fixed postion above said layer of heat absorbent material in vertically spaced relation thereto, said pair of similar superimposed metal plates defining a first open ended annular air duct, and said layer of heat absorbent material and said glass top defining a second open ended annular air duct; said layer of heat absorbent material being operative to absorb heat from the sun and to heat air passing through said second air duct by convection and radiation and to heat the upper plate of said pair of plates defining said first air duct by conduction, said upper plate being adapted to heat air passing through said first air duct by convection and radiation, and said glass top being also operative to increase the heating effect of said heat absorbent material.

13. An exothermic smog accumulation preventing device which utilizes sun rays to create ascending thermal currents of heated air, said device comprising a frusto-conical mound of earth, a layer of heat insulating material applied to the upper surface of said mound, a pair of similar superimposed frusto-conical metal plates one of which is applied to the upper surface of said layer of insulating material and the other of which is mounted in fixed position above said one of said plates in vertically spaced relation thereto, a layer of heat absorbent material applied to the upper surface of said other of said plates, and a frusto-conical glass top applied to the upper surface to said layer of heat absorbent material, said pair of similar superimposed metal plates defining an open ended annular air duct; the said layer of heat absorbent material being operative to absorb heat from the sun and to heat the upper plate of the pair of plates defining the air duct by conduction which upper plate is adapted to heat air passing through said air duct by convection and radiation, and said glass top serves to increase the heating effect of the said layer of heat absorbent material.

14. An exothermic smog accumulation preventing device which utilizes sun rays to create ascending thermal currents of heated air, said device comprising a mound structure, heat insulating material forming an upper surface of said mound structure, a heat storing and radiating material above said heat insulating material, upwardly inclined air duct portions open at the lower and upper ends thereof and overlying said heat storing and radiating material and communicating near their upper ends, and a layer of relatively non-reflective, heat absorbent material overlying said air duct portions operative to absorb heat from the sun and effect the heating of air in said duct portions to a temperature higher than the temperature of the ambient air and to cause the heated air to pass upwardly through said duct portions, said heat absorbent material having an opening therein at the top of said mound in communication with said duct portions through which said heated air may pass upwardly.

15. The combination defined in claim 14 in which said heat storing and radiative material comprises concrete.

16. An exothermic smog accumulation preventing device which utilizes sun rays to create ascending thermal currents of heated air, said device comprising a mound structure, heat insulating material forming an upper surface of said mound structure, a heat storing and radiating material above said heat insulating material, upwardly inclined air duct portions open at the lower and upper ends thereof and overlying said heat storing and radiating material and communicating near their upper ends, and a layer of heat ray passing material overlying said air duct portions operative to pass heat from the sun to said heat storing and radiating material and effect the heating of air in said duct portions to a temperature higher than the temperature of the ambient air and to cause the heated air to pass upwardly through said duct portions, said heat ray passing material having an opening therein at the top of said mound in communication with said duct portions through which said heated air may pass upwardly.

References Cited by the Examiner
UNITED STATES PATENTS

| | | | |
|---|---|---|---|
| 2,268,320 | 12/1941 | Brandt | 239—14 X |
| 2,553,881 | 5/1951 | Suttles | 98—31 X |
| 2,601,905 | 7/1952 | Anderegg | 98—31 X |

FOREIGN PATENTS 415,426  9/1910  France.

MEYER PERLIN, *Primary Examiner.*